US008322472B2

(12) United States Patent
Gonze

(10) Patent No.: US 8,322,472 B2
(45) Date of Patent: Dec. 4, 2012

(54) HYBRID VEHICLE EXHAUST CONTROL STRATEGY

(75) Inventor: Eugene V. Gonze, Pinckney, MI (US)

(73) Assignee: GM Global Technology Operations LLC

( * ) Notice: Subject to any disclaimer, the term of this patent is extended or adjusted under 35 U.S.C. 154(b) by 420 days.

(21) Appl. No.: 12/434,986

(22) Filed: May 4, 2009

(65) Prior Publication Data

US 2010/0276223 A1    Nov. 4, 2010

(51) Int. Cl.
| | |
|---|---|
| F01N 3/00 | (2006.01) |
| F01N 3/10 | (2006.01) |
| B60W 10/06 | (2006.01) |
| B60W 20/00 | (2006.01) |

(52) U.S. Cl. ............... 180/65.21; 180/65.275; 180/309; 123/676; 60/286; 60/300

(58) Field of Classification Search ............... 180/65.21, 180/65.27, 65.275, 309; 123/142.5 R, 672, 123/676, 697; 701/102; 60/282, 286, 287, 60/300, 303
See application file for complete search history.

(56) References Cited

U.S. PATENT DOCUMENTS

| | | | | |
|---|---|---|---|---|
| 5,327,991 | A * | 7/1994 | Yoshida | 180/65.245 |
| 5,345,761 | A * | 9/1994 | King et al. | 60/274 |
| 5,566,774 | A * | 10/1996 | Yoshida | 180/65.245 |
| 5,791,140 | A * | 8/1998 | Shimasaki et al. | 60/284 |
| 5,968,456 | A * | 10/1999 | Parise | 422/174 |
| 6,003,304 | A * | 12/1999 | Swanson et al. | 60/274 |
| 6,167,696 | B1 * | 1/2001 | Maaseidvaag et al. | 60/274 |
| 6,266,956 | B1 * | 7/2001 | Suzuki et al. | 60/278 |
| 6,321,530 | B1 * | 11/2001 | Hoshi et al. | 60/274 |
| 6,327,852 | B1 * | 12/2001 | Hirose | 60/297 |
| 6,381,955 | B1 * | 5/2002 | Morganti et al. | 60/300 |
| 6,931,850 | B2 * | 8/2005 | Frank et al. | 60/608 |
| 7,007,464 | B1 * | 3/2006 | Asami et al. | 60/300 |
| 7,792,627 | B1 * | 9/2010 | Santoso et al. | 701/102 |
| 2006/0059895 | A1 * | 3/2006 | Pott | 60/285 |
| 2006/0179820 | A1 * | 8/2006 | Sullivan | 60/275 |
| 2008/0256936 | A1 * | 10/2008 | Zuberi | 60/299 |
| 2008/0295493 | A1 | 12/2008 | Applegate et al. | |

FOREIGN PATENT DOCUMENTS

WO    WO 2008/149209 A1    11/2008

* cited by examiner

*Primary Examiner* — Ruth Ilan
*Assistant Examiner* — George Spisich

(57) ABSTRACT

A hybrid vehicle emission control method may include operating the hybrid vehicle in a first mode during which a combustion engine is off and an electric motor propels the hybrid vehicle. An electrically heated selective catalytic reduction catalyst (EHSCR) may be energized during the first mode. The vehicle may be operated in a second mode after the first mode during which the engine propels the hybrid vehicle.

18 Claims, 3 Drawing Sheets

US 8,322,472 B2

HYBRID VEHICLE EXHAUST CONTROL STRATEGY

FIELD

The present disclosure relates to hybrid vehicle exhaust control strategies.

BACKGROUND

This section provides background information related to the present disclosure which is not necessarily prior art.

Hybrid vehicles may include an internal combustion engine and a hybrid power assembly. Hybrid vehicles may be operated during extended periods of time in a hybrid mode using only the hybrid power assembly. During operation in the hybrid mode, the engine may be off. When the vehicle is switched to an engine operating mode, exhaust gas exiting the engine passes through an exhaust aftertreatment system. Components of the exhaust aftertreatment system may require minimum operating temperatures for proper operation. The engine may be powered on during the hybrid mode, even when not needed for additional power output, in order to maintain the exhaust aftertreatment system at a desired operating temperature. This results in reduced fuel economy.

SUMMARY

This section provides a general summary of the disclosure, and is not a comprehensive disclosure of its full scope or all of its features.

A hybrid vehicle emission control method may include operating the hybrid vehicle in a first mode during which a combustion engine is off and an electric motor propels the hybrid vehicle. An electrically heated selective catalytic reduction catalyst (EHSCR) may be energized during the first mode. The vehicle may be operated in a second mode after the first mode during which the engine propels the hybrid vehicle.

A control module may include a hybrid vehicle mode control module and an EHSCR control module. The hybrid vehicle mode control module may control vehicle operation in a first mode during which a combustion engine is off and an electric motor propels the vehicle and in a second mode during which the engine propels the vehicle. The EHSCR control module may be in communication with the hybrid vehicle mode control module and an electrically heated selective catalytic reduction catalyst (EHSCR) and may energize the EHSCR during the first mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
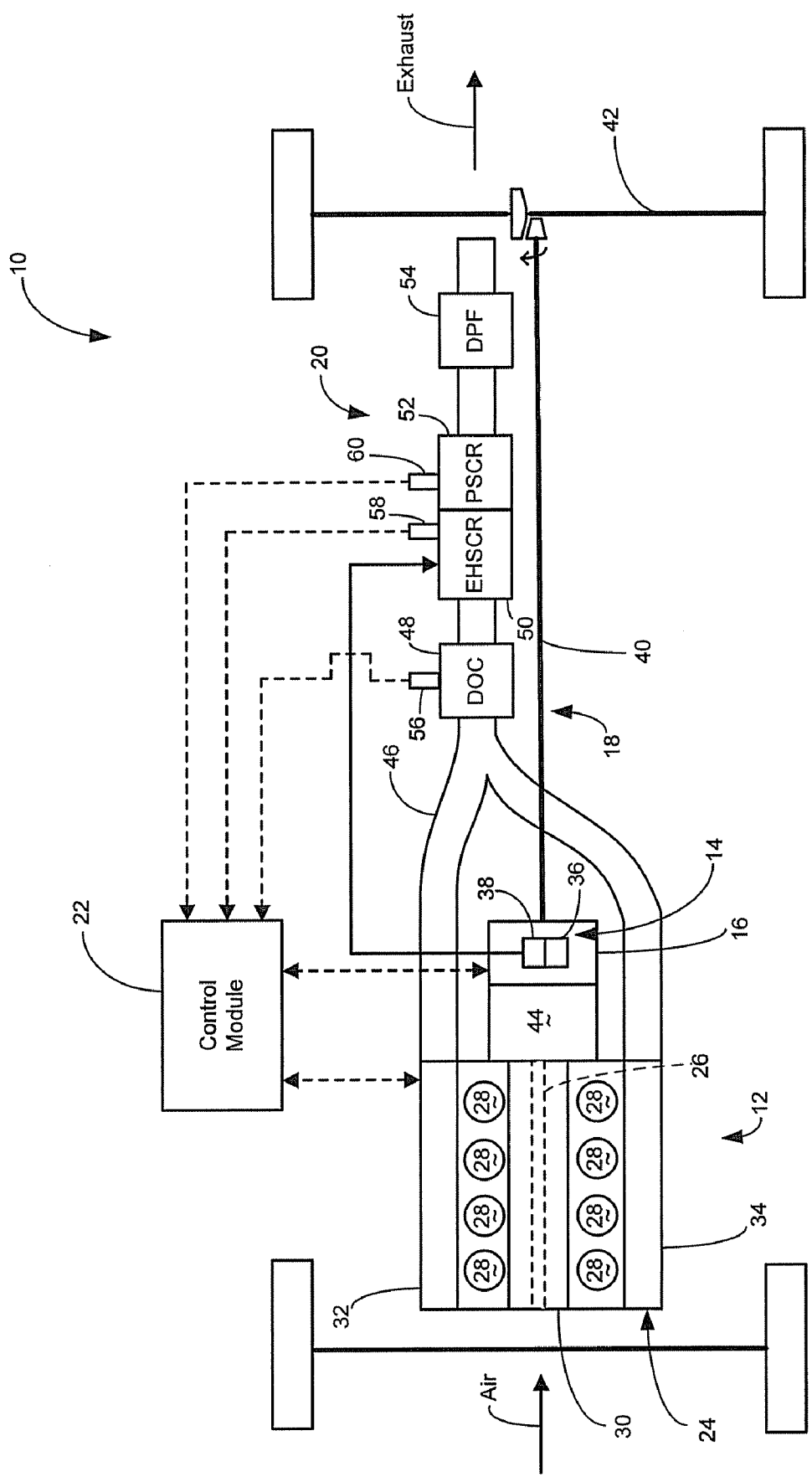
FIG. 1 is a schematic illustration of a vehicle according to the present disclosure.
Figure 2:
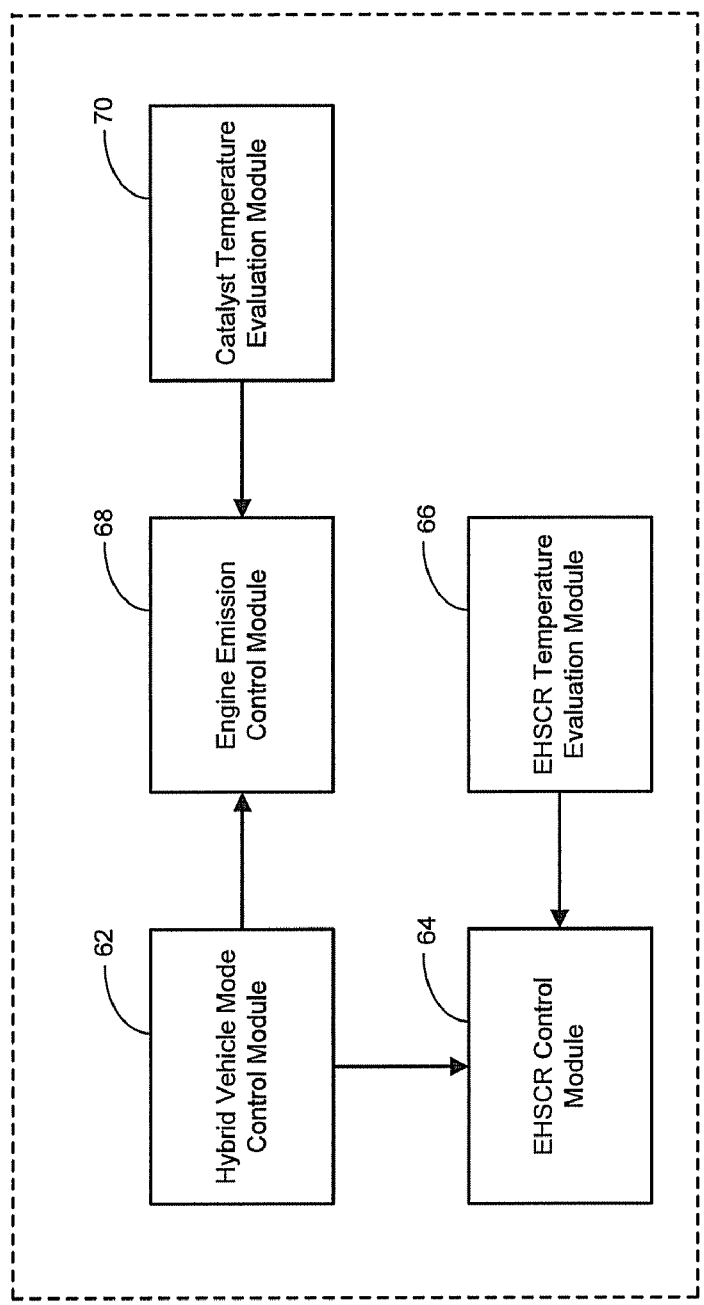
FIG. 2 is a schematic illustration of a control module of the vehicle of FIG. 1.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Referring to FIG. 1, an exemplary vehicle 10 may include an engine assembly 12, a hybrid power assembly 14, a transmission 16, a driveline assembly 18, an exhaust assembly 20, and a control module 22. The engine assembly 12 may include an internal combustion engine 24 having a crankshaft 26 rotationally driven by pistons 28, an intake manifold 30 providing an air flow to the engine 24 and exhaust manifolds 32, 34 receiving exhaust gas exiting the engine 24. While the following description is directed to diesel engines, it is understood that the present disclosure also applies to gasoline engines operated at air-fuel ratios below stoichiometry (lean operation).

The hybrid power assembly 14 may include an electric motor 36 and a rechargeable battery 38. The electric motor 36 and the rechargeable battery 38 may form a drive mechanism for the hybrid power assembly 14. The motor 36 may be in electrical communication with the battery 38 to convert power from the battery 38 to mechanical power. The motor 36 may additionally be powered by the engine 24 and operated as a generator to provide power to charge the battery 38. The hybrid power assembly 14 may be incorporated into and engaged with the transmission 16.

The driveline assembly 18 may include an output shaft 40 and a drive axle 42. The motor 36 may be coupled to the output shaft 40 via the transmission 16 to power rotation of the drive axle 42. The engine 24 may be coupled to the transmission 16 via a coupling device 44. The coupling device 44 may include a friction clutch or a torque converter. The transmission 16 may use the power from the engine 24 and/or the motor 36 to drive the output shaft 40 and power rotation of the drive axle 42.

The vehicle 10 may be operable in a variety of modes depending on power requirements. In a first operating mode, the engine 24 may be decoupled from the transmission 16 and the electric motor 36 may drive the output shaft 40. In a second operating mode, the crankshaft 26 may drive the output shaft 40 through combustion within the engine 24. In the second operating mode, the engine 24 may drive the output shaft 40 by itself or in combination with the electric motor 36. In a third operating mode, the engine 24 may drive the electric motor 36 to charge the battery 38 and may drive the output shaft 40.

The exhaust assembly 20 may include an exhaust conduit 46, a diesel oxidation catalyst (DOC) 48, an electrically heated selective catalytic reduction catalyst (EHSCR) 50, a passive selective catalytic reduction catalyst (PSCR) 52, a diesel particulate filter (DPF) 54, and first, second, and third temperature sensors 56, 58, 60. The exhaust conduit 46 may provide fluid communication between the exhaust manifolds 32, 34 and the DOC 48, EHSCR 50, PSCR 52, and DPF 54. The DOC 48 may be located upstream of the EHSCR 50 and the PSCR 52. The EHSCR 50 may be located upstream of the PSCR 52 and may be powered by the battery 38. The use of both the EHSCR 50 and the PSCR 52 may limit the power required to actively heat the selective catalytic reduction elements while providing a nominal nitrogen oxide ($NO_x$) treatment during engine start conditions.

The first temperature sensor 56 may be coupled to the DOC 48 and may be in communication with the control module 22, providing a signal to the control module 22 indicative of the temperature of the DOC 48. The second temperature sensor 58 may be coupled to the EHSCR 50 and may be in communication with the control module 22, providing a signal to the control module 22 indicative of the temperature of the EHSCR 50. The third temperature sensor 60 may be coupled to the PSCR 52 and may be in communication with the control module 22, providing a signal to the control module 22 indicative of the temperature of the PSCR 52.

The control module 22 may additionally be in communication with the hybrid power assembly 14 and the engine 24. The control module 22 may include a hybrid vehicle mode control module 62, an EHSCR control module 64, an EHSCR temperature evaluation module 66, an engine emission control module 68, and a catalyst temperature evaluation module 70. The hybrid vehicle mode control module 62 may control operation of the vehicle in the first, second, and third operating modes discussed above, as well as switching between the operating modes.

The hybrid vehicle mode control module 62 may be in communication with the EHSCR control module 64. The EHSCR control module 64 may be in communication with the EHSCR temperature evaluation module 66 and may receive a signal therefrom indicating power requirements for operating the EHSCR 50 at a desired temperature. The EHSCR temperature evaluation module 66 may receive signals from the second temperature sensor 58 indicative of the EHSCR operating temperature.

The hybrid vehicle mode control module 62 may be in communication with the engine emission control module 68 and may command engine operation when needed. The engine emission control module 68 may be in communication with the catalyst temperature evaluation module 70. The catalyst temperature evaluation module 70 may be in communication with the first and third temperature sensors 56, 60 and may receive signals therefrom indicative of the temperature of the DOC 48 and the temperature of the PSCR 52. The engine emission control module 68 may control fuel injection into the exhaust gas based on the inputs from the catalyst temperature evaluation module 70.

Figure 3:
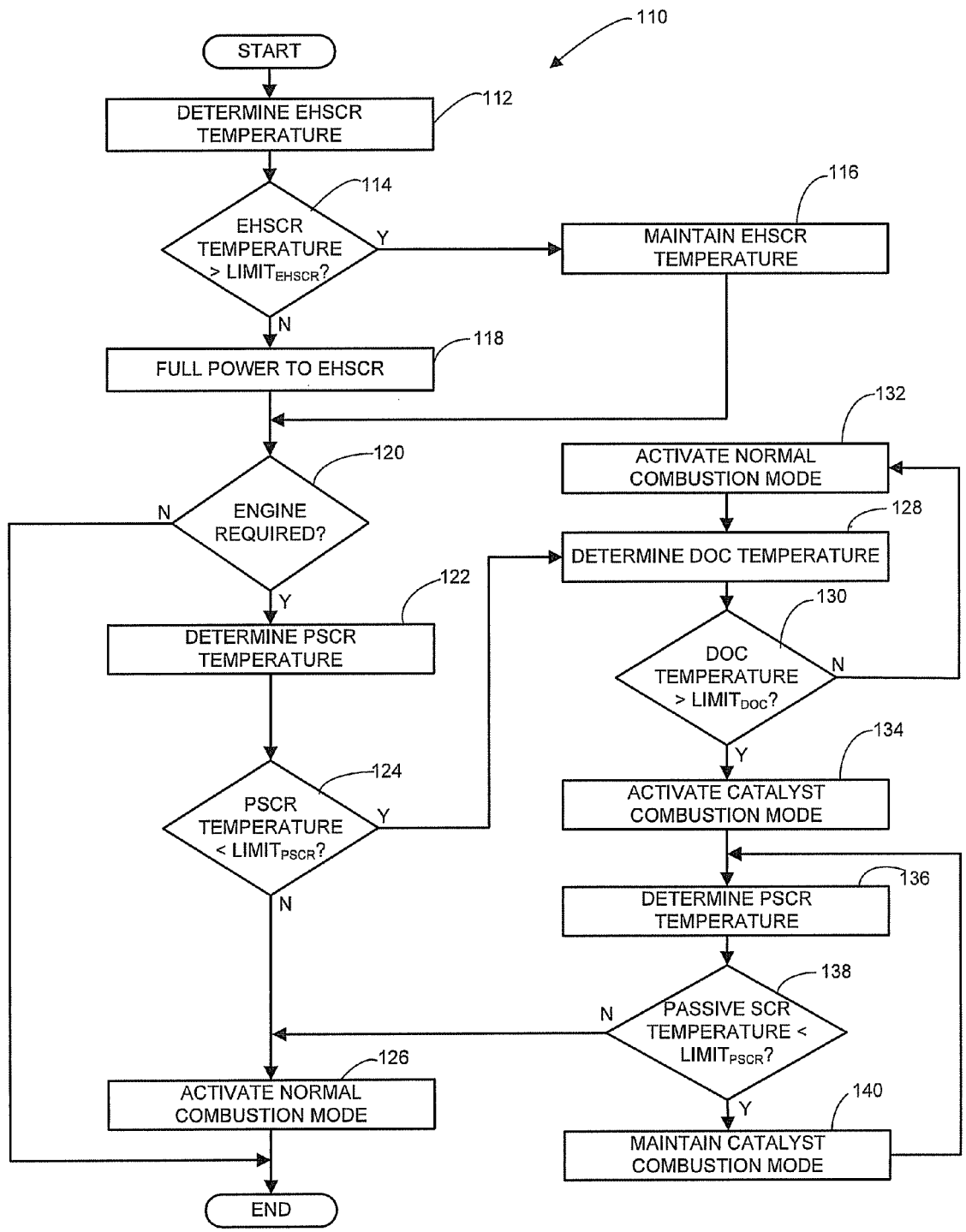
FIG. 3 is an illustration of control logic for operation of the vehicle of FIG. 1.

Control logic 110 for operation of the vehicle 10 is illustrated in FIG. 3. The hybrid vehicle mode control module 62 may initially operate the vehicle 10 in the first operating mode at start-up. Control logic 110 may begin at block 112 where the EHSCR temperature evaluation module 66 determines the temperature of EHSCR 50 during vehicle operation in the first operating mode. Control logic 110 then proceeds to block 114 where the EHSCR temperature is evaluated. If the EHSCR temperature is above a predetermined limit ($LIMIT_{EHSCR}$), control logic 110 proceeds to block 116 where EHSCR temperature is maintained by the EHSCR control module 64. The predetermined limit ($LIMIT_{EHSCR}$) may include a temperature where the EHSCR 50 maintains nominal $NO_x$ treatment efficiency, such as at or above two hundred degrees Celsius. The temperature of the EHSCR 50 may be maintained by controlling the powering of the EHSCR 50 by the battery 38. Control logic 110 may then proceed to block 120.

If the EHSCR temperature is below the predetermined limit ($LIMIT_{EHSCR}$), control logic 110 proceeds to block 118 where EHSCR temperature is increased by the EHSCR control module 64. The temperature of the EHSCR 50 may be increased by controlling the powering of the EHSCR 50 by the battery 38. For example, when the EHSCR 50 is operating at a temperature below the predetermined limit ($LIMIT_{EHSCR}$), the battery 38 may provide fully power to the EHSCR 50. The EHSCR 50 may remain powered (or energized) throughout operation in the first operating mode. The EHSCR 50 may reach a temperature at or above the predetermined limit ($LIMIT_{EHSCR}$) before vehicle operation in the second operating mode. Control logic 110 may then proceed to block 120, where the vehicle operating mode is evaluated by the hybrid vehicle mode control module 62. More specifically, control logic 110 determines whether engine operation is required. If engine operation is not required, control logic 110 may terminate and the vehicle may continue operation in the first operating mode. Otherwise, control logic 110 may proceed to block 122 where the temperature of the PSCR 52 is determined by the catalyst temperature evaluation module 70. The temperature of the PSCR 52 may be determined before operation of the vehicle in the second operating mode. After the temperature of the PSCR 52 is determined, control logic 110 may proceed to block 124.

If the temperature of the PSCR 52 is above a predetermined limit ($LIMIT_{PSCR}$), control logic 110 may proceed to block 126 where a normal combustion mode is activated by engine emission control module 68. The predetermined limit ($LIMIT_{PSCR}$) may include a temperature of at least two hundred degrees Celsius. The normal combustion mode may generally include in-cylinder combustion based on vehicle power requirements without the injection of fuel into the exhaust gas. Control logic 110 may then terminate. If the temperature of the PSCR 52 is below the predetermined limit ($LIMIT_{PSCR}$), control logic 110 may proceed to block 128 where the temperature of the DOC 48 is determined by the catalyst temperature evaluation module 70. After the temperature of the DOC 48 is determined, control logic 110 may proceed to block 130.

If the temperature of the DOC 48 is below a predetermined limit ($LIMIT_{DOC}$), control logic 110 may proceed to block 132 where the normal combustion mode is activated by engine emission control module 68. The predetermined limit ($LIMIT_{DOC}$) may include a temperature of at least two hundred degrees Celsius. Control logic 110 may then return to block 128 where the temperature of the DOC 48 is again determined. If the temperature of the DOC 48 is above the predetermined limit ($LIMIT_{DOC}$), control logic 110 may proceed to block 134 where a catalyst combustion mode is activated by engine emission control module 68. The catalyst combustion mode may generally include the injection of fuel into the exhaust gas at a location upstream of the DOC 48. The fuel injection may be provided in the cylinders of the engine 24 during exhaust strokes of the pistons 28 or by an additional fuel injector (not shown) in the exhaust assembly 20. The combination of the fuel, oxygen rich diesel engine exhaust and the heat of the DOC 48 may provide combustion within the DOC 48. The heat from combustion may assist in raising the temperature of the PSCR 52.

After the catalyst combustion mode has been activated, control logic 110 may proceed to block 136 where the temperature of the PSCR 52 is again determined by the catalyst temperature evaluation module 70. Control logic 110 may then proceed to block 138 where the temperature of the PSCR 52 is evaluated. If the PSCR is still below the predetermined limit ($LIMIT_{PSCR}$), control logic 110 may proceed to block 140 where the catalyst combustion mode is maintained. Control logic 110 may then return to block 136. If the temperature of the PSCR 52 is above the predetermined limit ($LIMIT_{P-}$ SCR), control logic 110 may proceed to block 126 where the vehicle is transitioned from the catalyst combustion mode to the normal combustion mode. Control logic 110 may then terminate.

What is claimed is:

1. A method comprising:
   operating a hybrid vehicle in a first mode during which a combustion engine is off and an electric motor propels the hybrid vehicle;
   energizing an electrically heated selective catalytic reduction catalyst (EHSCR) during the first mode;
   operating the vehicle in a second mode after the first mode during which the engine propels the hybrid vehicle;
   determining a first operating temperature of a passive selective catalytic reduction catalyst (PSCR) in communication with exhaust gas from the combustion engine and located downstream of the EHSCR; and
   operating the vehicle in a catalyst combustion mode during the second mode when the first operating temperature is below a first predetermined limit, wherein the catalyst combustion mode includes injecting fuel into exhaust gas from the engine at a location before the PSCR.

2. The method of claim 1, further comprising determining a second operating temperature of the PSCR after operating the engine in the catalyst combustion mode and maintaining engine operation in the catalyst combustion mode when the second operating temperature is below the first predetermined limit.

3. The method of claim 2, wherein the first predetermined limit is at least 200 degrees Celsius.

4. The method of claim 2, further comprising deactivating the catalyst combustion mode when the second operating temperature is above the first predetermined limit.

5. The method of claim 1, further comprising determining a second operating temperature of an oxidation catalyst located upstream of the EHSCR before operating the vehicle in the second mode, wherein the engine operates in the catalyst combustion mode during the second mode when the second operating temperature is above a second predetermined limit.

6. The method of claim 5, wherein the second predetermined limit is at least 200 degrees Celsius.

7. The method of claim 5, wherein the fuel is injected at a location upstream of the oxidation catalyst.

8. The method of claim 1, wherein the EHSCR is maintained at an operating temperature of at least 200 degrees Celsius during vehicle operation in the first and second modes.

9. The method of claim 1, wherein the EHSCR is energized and operated at a temperature of at least 200 degrees Celsius before operation in the second mode.

10. A control module comprising:
    a hybrid vehicle mode control module controlling vehicle operation in a first mode during which a combustion engine is off and an electric motor propels the vehicle and in a second mode during which the engine propels the vehicle;
    an EHSCR control module in communication with the hybrid vehicle mode control module and an electrically heated selective catalytic reduction catalyst (EHSCR) and energizing the EHSCR during the first mode;
    a catalyst temperature evaluation module determining an operating temperature of a passive selective catalytic reduction catalyst (PSCR); and
    an engine emission control module in communication with the hybrid vehicle mode control module and the catalyst temperature evaluation module and operating the vehicle in a catalyst combustion mode during the second mode when the operating temperature is below a first predetermined limit, the catalyst combustion mode including injecting fuel into exhaust gas from the engine at a location before the PSCR.

11. The control module of claim 10, wherein the catalyst temperature evaluation module determines a second operating temperature of the PSCR after operating the engine in the catalyst combustion mode and the engine emission control module maintains engine operation in the catalyst combustion mode when the second operating temperature is below the first predetermined limit.

12. The control module of claim 11, wherein the first predetermined limit is at least 200 degrees Celsius.

13. The control module of claim 11, wherein the engine emission control module deactivates engine operation in the catalyst combustion mode when the second operating temperature is above the first predetermined limit.

14. The control module of claim 10, wherein the catalyst temperature evaluation module determines a second operating temperature of an oxidation catalyst located upstream of the EHSCR before operating the vehicle in the second mode, and wherein the engine emission control module operates the engine in the catalyst combustion mode during the second mode when the second operating temperature is above a second predetermined limit.

15. The control module of claim 14, wherein the second predetermined limit is at least 200 degrees Celsius.

16. The control module of claim 14, wherein the fuel is injected at a location upstream of the oxidation catalyst.

17. The control module of claim 10, wherein the EHSCR control module maintains the EHSCR at an operating temperature of at least 200 degrees Celsius during vehicle operation in the first and second modes.

18. The control module of claim 10, wherein the EHSCR control module energizes and operates the EHSCR at a temperature of at least 200 degrees Celsius before operation in the second mode.

* * * * *